US010873203B2

(12) United States Patent
Teich et al.

(10) Patent No.: US 10,873,203 B2
(45) Date of Patent: Dec. 22, 2020

(54) SYSTEMS AND METHODS FOR WIRELESS CHARGING OF DEVICES

(71) Applicant: FLIR SYSTEMS, INC., Wilsonville, OR (US)

(72) Inventors: Andrew C. Teich, West Linn, OR (US); Ilan L. Gershon, Maple (CA)

(73) Assignee: FLIR Commercial Systems, Inc., Goleta, CA (US)

( * ) Notice: Subject to any disclaimer, the term of this patent is extended or adjusted under 35 U.S.C. 154(b) by 359 days.

(21) Appl. No.: 15/906,199

(22) Filed: Feb. 27, 2018

(65) Prior Publication Data

US 2018/0287414 A1    Oct. 4, 2018

Related U.S. Application Data

(60) Provisional application No. 62/480,264, filed on Mar. 31, 2017.

(51) Int. Cl.
*H02J 7/02* (2016.01)
*H02J 7/00* (2006.01)
(Continued)

(52) U.S. Cl.
CPC .......... *H02J 7/025* (2013.01); *G06F 8/65* (2013.01); *H02J 7/0042* (2013.01); *H02J 50/10* (2016.02);
(Continued)

(58) Field of Classification Search
CPC ........ H04N 7/185; H04N 7/18; H04B 5/0075; G06F 8/65; H02J 50/10; H02J 7/0042;
(Continued)

(56) References Cited

U.S. PATENT DOCUMENTS 5,812,703 A * 9/1998 Juen ................. H04N 5/3651
  348/243
6,429,622 B1 * 8/2002 Svensson ......... H04M 1/7253
  320/106
(Continued)

OTHER PUBLICATIONS

Chokkattu, Julian, "Don't have wireless charging? This magnetic charger juices up any phone without wires," DigitalTrends.com, [retrieved on Nov. 9, 2018], 2 Pages[online]. Retrieved from the Internet: <https://www.digitaltrends.com/mobile/gecko-magnetic-indiegogo/>.

(Continued)

*Primary Examiner* — M Baye Diao
(74) *Attorney, Agent, or Firm* — Haynes and Boone, LLP

(57) ABSTRACT

Techniques are disclosed for facilitating wireless charging of devices. A battery-operated device may include a charging interface. The battery-operated device may further include a magnetic element configured to secure a charging device to the battery-operated device. The battery-operated device may further include a battery configured to be charged by the charging device via power received through the charging interface from the charging device when the charging device is secured to the battery-operated device. The battery-operated device may include a communication circuit configured to provide for transmission information associated with the battery to a user device. Related systems, devices, and methods are also disclosed.

20 Claims, 7 Drawing Sheets

(51) Int. Cl.
*H02J 50/10* (2016.01)
*G06F 8/65* (2018.01)
*H04B 5/00* (2006.01)
*H04N 7/18* (2006.01)
*H04L 29/08* (2006.01)
*H04L 29/06* (2006.01)
*H01M 10/42* (2006.01)

(52) U.S. Cl.
CPC ........... *H04B 5/0075* (2013.01); *H04N 7/185* (2013.01); *H01M 10/4257* (2013.01); *H02J 7/00034* (2020.01); *H02J 7/00045* (2020.01); *H02J 7/0047* (2013.01); *H02J 7/0048* (2020.01); *H04L 63/08* (2013.01); *H04L 67/34* (2013.01); *H04N 7/18* (2013.01)

(58) Field of Classification Search
CPC .. H02J 7/0048; H02J 7/00045; H02J 7/00034; H02J 7/0047; H01M 10/4257; H04L 63/08; H04L 67/34
USPC .......................................................... 320/108
See application file for complete search history.

(56) References Cited

U.S. PATENT DOCUMENTS

| | | | | |
|---|---|---|---|---|
| 7,330,215 | B2 * | 2/2008 | Ito | H04N 1/00236 348/373 |
| 7,793,121 | B2 * | 9/2010 | Lawther | H02J 7/025 713/300 |
| 7,930,463 | B2 * | 4/2011 | Sekiguchi | G06F 13/4081 710/316 |
| 8,234,509 | B2 * | 7/2012 | Gioscia | G06F 1/1632 713/300 |
| 8,946,938 | B2 * | 2/2015 | Kesler | H02J 50/12 307/104 |
| 8,963,488 | B2 * | 2/2015 | Campanella | H02J 5/005 320/108 |
| 9,444,520 | B2 * | 9/2016 | Hall | B60L 53/51 |
| 9,717,552 | B2 * | 8/2017 | Cosman | A61B 18/1482 |
| 9,961,431 | B2 * | 5/2018 | McPeak | A45C 13/1069 |
| 10,164,468 | B2 * | 12/2018 | Fitzgerald | H02J 7/0047 |
| 10,340,723 | B2 * | 7/2019 | Jung | H02J 50/10 |
| 2004/0070683 | A1 * | 4/2004 | Thorland | H04N 5/2354 348/371 |
| 2006/0145659 | A1 * | 7/2006 | Patino | H02J 7/025 320/108 |
| 2008/0118093 | A1 * | 5/2008 | Klemenz | H04R 25/55 381/324 |
| 2010/0146308 | A1 * | 6/2010 | Gioscia | H02J 5/005 713/300 |
| 2012/0274266 | A1 * | 11/2012 | Yip | G06F 15/17331 320/106 |
| 2015/0186693 | A1 * | 7/2015 | Blair | G06Q 10/0833 340/10.1 |
| 2015/0320481 | A1 * | 11/2015 | Cosman, Jr. | A61B 34/10 606/35 |
| 2016/0165367 | A1 * | 6/2016 | Ochsenbein | H04R 25/602 381/323 |
| 2020/0084533 | A1 * | 3/2020 | Hankey | H04R 1/1025 |

OTHER PUBLICATIONS

Fitzpatrick, Jason, "The Complete Guide to Wirelessly Charging Your Gadgets," How-To Geek, Nov. 3, 2016, [retrieved on Nov. 9, 2018], 7 Pages[online]. Retrieved from the Internet: <https://www.howtogeek.com/185191/the-htg-guide-to-wirelessly-charging-your-gadgets/>.

"Magnetic Charging Dock DK30," Sony, [retrieved on Nov. 9, 2018], 3 Pages[online]. Retrieved from the Internet: <https://support.sonymobile.com/global-en/magneticchargingdockdk30/userguide/charging-your-phone---accmw/>.

"Wireless Charging Guide: What is it and which phones are supported?" MobileFun, [retrieved on Nov. 9, 2018], 5 Pages[online]. Retrieved from the Internet: <https://www.mobilefun.co.uk/blog/wireless-charging-guide/>.

* cited by examiner

SYSTEMS AND METHODS FOR WIRELESS CHARGING OF DEVICES

CROSS-REFERENCE TO RELATED APPLICATIONS

This application claims the benefit of and priority to U.S. Provisional Patent Application No. 62/480,264 filed Mar. 31, 2017 and entitled "SYSTEMS AND METHODS FOR WIRELESS CHARGING OF DEVICES," which is incorporated herein by reference in its entirety.

TECHNICAL FIELD

One or more embodiments relate generally to charging of devices and more particularly, for example, to facilitating wireless charging of devices using a charging device.

BACKGROUND

Wireless (also referred to as wire-free), battery-operated cameras, and other wireless, battery-operated devices, are becoming increasingly popular. Such cameras may be easier and/or more convenient to install than wired cameras. In some cases, such cameras may be provided where wired connections are difficult, cumbersome, costly to implement, and/or not preferable (e.g., wires add clutter and/or tripping hazards). For example, an external power source may not be readily accessible where the cameras are to be installed. Similarly, recharging and/or replacing of batteries of such cameras may also be difficult, cumbersome, costly to implement, and/or not preferable. For example, the cameras may need to be removed (e.g., from where they are mounted); plugged in to a wall outlet to charge; opened to replace the battery/batteries; and/or opened to extract the battery/batteries, place the battery/batteries in a battery charger, and put back in the cameras.

SUMMARY

In one or more embodiments, a device includes a charging interface. The device further includes a magnetic element configured to secure a charging device to the device. The device further includes a battery configured to be charged by the charging device via power received through the charging interface from the charging device when the charging device is secured to the device. The device further comprises a communication circuit configured to provide for transmission information associated with the battery to a user device.

In one or more embodiments, a method includes coupling a charging device to a battery-operated device using at least a magnetic element of the battery-operated device to secure the charging device to the battery-operated device. The method further includes charging a battery of the battery-operated device via power received from the charging device when the charging device is secured to the battery-operated device. The method further includes providing for transmission, using the battery-operated device, information associated with the battery to a user device.

In one or more embodiments, a charging device includes a charging interface. The charging device further includes a magnetic element configured to secure the charging device to a battery-operated device. The charging device further includes a battery configured to provide power to the battery-operated device via the charge interface when the charging device is secured to the battery-operated device. The charging device further includes a memory comprising data. The charging device further includes a communication circuit configured to provide for transmission the data to the battery-operated device while the power is being provided to the battery-operated device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
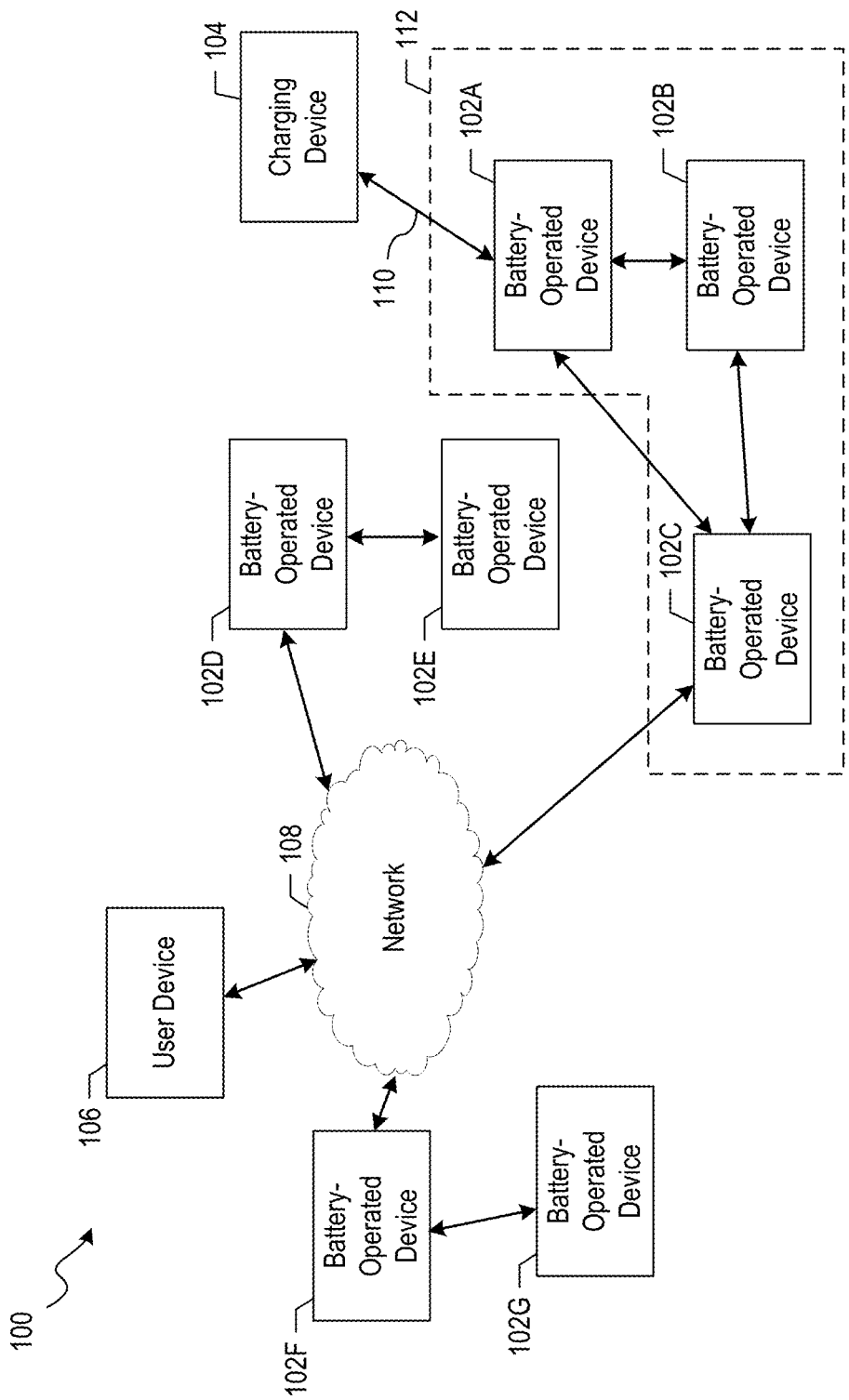
FIG. 1 illustrates an example network environment in which wireless charging of devices may be implemented in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, techniques for wireless charging of devices (e.g., battery-operated devices) are provided. Such techniques may allow a user to easily and conveniently attach a charging device to a battery-operated device to charge (e.g., transfer power to) the battery-operated device and remove the charging device once the battery-operated device is sufficiently charged (e.g., to a desired charge/battery level). In an aspect, the battery-operated device and the charging device may include a magnetic element(s) to secure the charging device to the battery-operated device. The magnetic element(s) may include magnets, ferromagnetic material (e.g., iron, nickel, cobalt), and/or generally any structure/material that can attract magnetic material and/or be attracted to magnetic material. The magnetic element(s) may allow the charging device to be easily attached to the battery-operated device (e.g., by the user) and remain secured (e.g., held and charged/powered in place) to the battery-operated device. For instance, the magnetic element(s) of the battery-operated device may have polarities and magnetic strength appropriate to support charging devices of various sizes/weights.

The battery-operated device and the charging device may include a charging interface(s) that, when coupled, allow transfer of power (e.g., current, voltage) from the charging device to the battery-operated device (e.g., to a battery of the battery-operated device). In this regard, the magnetic element(s) of the battery-operated device and the charging device may help align the battery-operated device and the charging device (e.g., via magnetic attraction) such that their charging interfaces are coupled to allow power transfer. In some cases, the power transfer may be through direct contact between the charging interfaces of the battery-operated device and those of the charging device. In some cases, alternatively or in addition, the power transfer may be through indirect contact, such as inductive coupling between the charging interfaces of the battery-operated device and those of the charging device. In an aspect, a charging interface may also be referred to as a charging port. In some cases, at least a portion of the charging interface(s) and/or magnetic element(s) of the battery-operated device and/or charging device may be exposed (e.g., external to a housing of the devices).

In some cases, the magnetic element(s) and charging interface(s) of the battery-operated device and/or charging device may be weatherproof to allow charging in various weather conditions. Alternative or in addition, a protective cover(s) (e.g., silicone cover) may be utilized to protect the charging interface(s) and/or magnetic element(s) (e.g., exposed portions thereof) from weather conditions (e.g., rain, snow, wind, heat). In some cases, the protective cover(s) may be removed prior to attaching the charging device to the battery-operated device.

Such wireless charging techniques may provide manners by which to conveniently recharge battery-operated devices with compatible charging devices. In this regard, in some cases, the battery-operated devices can be recharged without down time to operation of the battery-operated devices (e.g., down time associated with removing battery-operated devices to replace/swap and/or recharge the battery/batteries). In an aspect, a compatible charging device has appropriate magnetic element(s) and charging interface(s) to allow securing of and power transfer from the charging device to the battery-operated device. In some cases, the battery-operated device(s) and charging device(s) may be part of a common system/application (e.g., surveillance, sensor, and/or communication system/application) and/or designed/manufactured with compatibility in mind, such that the battery-operated device(s) and charging device(s) are designed with size, shape, magnetic element(s) positioning, and charge interface(s) positioning compatible with each other. Once the battery-operated device is sufficiently charged, the user may remove the charging device (e.g., at the user's convenience).

In some aspects, the charging device may have memory that is used to store information associated with a software update(s), diagnostic tools/software, and/or instructions. Such software update(s), diagnostic tools/software, and/or instructions may be obtained and/or executed by the battery-operated device while the charging device is charging the battery-operated device for example. In some cases, the charging device may have communication capability (e.g., wireless communication capability) to allow communication between the charging device and the battery-operated device. For example, the charging device may transmit the software update(s) to the battery-operated device using one or more wireless communication technologies, such as Wi-Fi (IEEE 802.11ac, 802.11ad, etc.), cellular (3G, 4G, 5G, etc.), Bluetooth™, near field communication (NFC), and/or infrared-based communication.

In an aspect, the battery-operated devices and charging devices may have security-related parameters (e.g., user credentials, security keys, etc.). For example, a battery-operated device may need to authenticate to a charging device, and/or vice versa. The charging device may be set to charge the battery-operated device and/or provide a software update(s) to the battery-operated device upon successful authentication. Upon failing authentication a threshold number of times, the user may be provided a notification, such as in a message on a display (if available) of the battery-operated device and/or the charging device, in a text message transmitted to a device (e.g., mobile phone) associated with the user, and/or other manners.

In an embodiment, the battery-operated devices may be imaging devices utilized in a surveillance system. The imaging device(s) and charging device(s) may be packaged together for use in setting up the surveillance system, such that the imaging device(s) and charging device(s) are designed with size, shape, magnetic element(s) positioning, and charge interface(s) positioning compatible with each other. In such security-based systems/applications, use of a charging device to recharge an imaging device may allow continuous operation (e.g., zero down time) of the imaging device (e.g., to capture image/video data) while the imaging device is being charged by the charging device. In this regard, the imaging device does not need to be removed (e.g., taken down from where it is placed for surveillance purposes) and/or connected to a power cable in order to be have its battery/batteries recharged or replaced. For instance, an imaging device and an attached charging device may be suspended off the ground, with a top surface of the charging device being secured to a bottom surface of the imaging device. The user may recharge the imaging device by attaching the charging device to the bottom surface of the imaging device with no or minimal interference with imaging performed by the imaging device. Thus, the imaging device(s) may be installed and recharged at locations where wired connections are difficult, cumbersome, costly to implement, and/or not preferable. When needed, the charging device itself may be recharged by obtaining power (e.g., via wired or wireless transfer) from an external power source. The charging of the charging device generally does not affect operation of the imaging devices.

Turning now to the figures, FIG. 1 illustrates an example network environment 100 in which wireless charging of devices may be implemented in accordance with one or more embodiments of the present disclosure. Not all of the depicted components may be required, however, and one or more embodiments may include additional components not shown in FIG. 1. Variations in the arrangement and type of the components may be made without departing from the spirit or scope of the claims as set forth herein. Additional, fewer, and/or different components may be provided.

The network environment 100 includes battery-operated devices 102A-G, a charging device 104, a user device 106, and a network 108. The battery-operated devices 102A-G may each include one or more batteries that may be charged by the charging device 104. The battery-operated devices 102A-G may be capable of communicating with one or more other devices of the battery-operated devices 102A-G and/or user device 106, e.g. via wired or wireless communication. For example, in FIG. 1, the battery-operated device 102C may communicate with the battery-operated device 102F and/or the user device 106 via the network 108 (e.g., a wireless network). The battery-operated devices 102A-G and/or user device 106 may communicate using one or more wireless communication technologies, such as Wi-Fi (IEEE 802.11ac, 802.11ad, etc.), cellular (3G, 4G, 5G, etc.), Bluetooth™, NFC, infrared-based communication, etc. and/or one or more wired communication technologies. The network 108 may include a local area network (LAN), a wide area network (WAN), an Intranet, or a network of networks (e.g., the Internet).

In some embodiments, the charging device 104 may have communication capability (e.g., wireless and/or wired communication capability) that allows the battery-operated devices 102A-G and/or the user device 106 to communicate with the charging device 104. In other embodiments, the charging device 104 does not have communication capability, or does not utilize its communication capability for communicating with battery-operated devices and/or other devices, in which case the charging device 104 may be utilized strictly for charging battery-operated devices, such as the battery-operated devices 102A-G.

Connections shown in FIG. 1 (represented by double-headed arrows) between the battery-operated devices 102A-G, charging device 104, and user device 106 are provided by way of non-limiting example and may represent wireless and/or wired connections. The connections may be, or may include, connections for communicating information between the devices, e.g. via wireless and/or wired technologies. A connection 110 between the battery-operated device 102A and the charging device 104 may be, or may include, a connection to allow wireless or wired charging (e.g., power transfer) of the battery-operated device 102A by the charging device 104, and/or a connection to allow wireless and/or wired communication of information between the devices 102A and 104. In some cases, the connection used to charge of the battery-operated device 102A by the charging device 104 may be separate from the connection used to communicate information between the devices 102A and 104. Although bidirectional connections are shown in FIG. 1, connections may be unidirectional. Additional, fewer, and/or different connections may be provided.

The charging device 104 may charge one or more batteries of the battery-operated devices 102A-G. The charging device 104 itself may include one or more batteries that can be recharged by obtaining power (e.g., via wired or wireless transfer) from an external power source. For example, the external power source may be another charging device, an electrical wall outlet (e.g., connected via a standard cable adapter), and/or a charging cradle. In an aspect, the charging device 104 may be a battery pack that can attached/mounted to a battery-operated device (e.g., the battery-operated device 102A) to charge the battery-operated device.

The battery-operated devices 102A-G and charging device 104 have a respective charging interface(s) to allow transfer of power from the charging device 104 to the battery-operated devices 102A-G. The charging interface(s) of the charging device 104 may transfer power to the charging interface(s) of the battery-operated devices 102A-G when their charging interface(s) are coupled to each other. As an example, a charging interface of the battery-operated device 102A and the charging device 104 may each be a coil, such that the coils may inductively couple and allow transfer of power to the battery-operated device 102A via inductive coupling. In some cases, the charging device 104 and user device 106 may have appropriate/compatible charging interface(s) to allow one or more batteries of the user device 106 to be charged by the charging device 104. Additional examples of charging interfaces are described, for example, with respect to FIGS. 2A-2D of the present disclosure.

To facilitate charging of the battery-operated devices 102A-G by the charging device 104, the charging device 104 may be releasably attached to the battery-operated devices 102A-G. In an aspect, the battery-operated devices 102A-G and the charging device 104 may include one or more magnetic elements to facilitate an attachment between a battery-operated device and the charging device 104 and allow the charging device 104 to be securely attached to the battery-operated device that is being charged by the charging device 104. The magnetic elements may include magnets (e.g., permanent magnets), ferromagnetic materials (e.g., iron, nickel, cobalt), and/or generally any structure/material that can attract magnetic materials and/or be attracted to magnetic materials. In some cases, to secure the charging device 104 to a battery-operated device, at least one of the charging device 104 or the battery-operated device has a magnetic element that can attract magnetic materials. Example configurations for securing the charging device 104 to any one of the battery-operated devices 102A-G are described, for example, with respect to FIGS. 3A-3D of the present disclosure.

In an aspect, the magnetic element(s) of a battery-operated device and/or the charging device 104 may help align the charging device 104 to the battery-operated device. Such alignment may facilitate coupling of the charging interfaces of the charging device 104 and those of the battery-operated device and thus facilitate charging of the battery-operated device by the charging device 104. For example, when the user desires to charge the battery-operated device 102B, the user may hold the charging device 104 in proximity to the battery-operated device 102B to allow power transfer or, more preferably, attach the charging device 104 to the battery-operated device 102B to allow power transfer. The magnetic element(s) of the battery-operated device 102B and charging device 104 may help the user attach and secure the charging device 104 to the battery-operated device 102B. For example, to facilitate alignment, such as when the charging device 104 needs to be attached in a certain manner to allow power transfer, the magnetic element(s) of the battery-operated device 102B and charging device 104 may repel each other when the magnetic element(s) are misaligned and attract each other when the magnetic element(s) are aligned (e.g., based on orientation of polarities of the magnetic element(s)). The magnetic attraction and repulsion may help guide the charging device 104 toward the correct alignment, e.g. based on user adjustment of the devices 102B and/or 104 and/or force exerted by the magnetic attraction/repulsion.

In an aspect, a correct charging alignment (or more simply a correct alignment) may refer to an alignment that allows the charging device (e.g., 104) to be secured to the battery-operated device (e.g., 102B) and the charging interface(s) of the charging device to couple to the charging interface(s) of the battery-operated device to facilitate power transfer from the charging device to the battery-operated device. When the battery-operated device and charging device are misaligned (e.g., deviate from a correct charging alignment), coupling between their respective charging interface(s) may be small or non-existent, such that little or no power is transferred from the charging device to the battery-operated device. To facilitate use of the battery-operated device 102B and charging device 104, the magnetic element(s) in one or both devices may be selected/oriented to provide many correct charging alignments and/or to allow the user to easily determine the correct charging alignment(s) (e.g., based on strength of magnetic attraction/repulsion between the magnetic element(s) of the devices 102B and 104).

In an embodiment, the charging device 104 may have memory that stores information associated with a software update(s), diagnostic tools/software, and/or instructions. In an aspect, when the charging device 104 is in proximity or attached to the battery-operated device, the charging device 104 may transmit and/or allow the battery-operated device to retrieve (e.g., read, download) the security update(s), diagnostic software, and/or instructions from the charging device 104. The software update(s) may be associated with an application installed on the battery-operated devices 102A-G. For example, the battery-operated devices 102A-G and the charging device 104 may be part of a security system with associated security software. A provider, an administrator, a user, and/or other party associated with the security system may store the software update in the charging device 104. The software update may be loaded into the charging device 104 by providing the software update to the charging device 104 via a wired and/or wireless communication.

In an aspect, the charging device 104 may provide (e.g., transmit, allow retrieval of) a software update to a battery-operated device (e.g., 102A) while the battery-operated device is being charged. In some cases, the battery-operated device may determine whether it has the latest software update(s) and, if not, obtain the software update(s) from the charging device 104. In some cases, the charging device 104 may provide the information without being utilized to charge the is battery-operated device.

When the charging device 104 is secured to the battery-operated device, the charging device 104 may provide instructions that, when executed, cause the battery-operated device to obtain the software update(s) from the charging device 104 if the battery-operated device does not have the latest software update(s), obtain diagnostic tools from the charging device 104 and/or run diagnostic tools, and/or perform other actions while the charging device 104 is charging the battery-operated device. In these cases, the charging device 104 may be utilized as a controller that provides control signals to cause the battery-operated device to perform certain actions.

In other cases, when the charging device 104 is secured to the battery-operated device, the battery-operated device may perform such actions without being provided the instructions by the charging device 104. For instance, the actions to be performed may be set during an initial setup to associate the charging device 104 with the battery-operated device. In these cases, the charging device 104 may be utilized as an external memory for storing the software update(s) and/or diagnostic tool(s), without providing control signals to the battery-operated device.

In an aspect, the diagnostic tools may be used to determine performance characteristics associated with the battery-operated device, such as power usage (e.g., of the battery or batteries), battery charging efficiency, discharge rate, and/or other characteristics. The determined performance characteristics can be stored in the charging device 104 and/or battery-operated device for later retrieval and use (e.g., by the user). For example, with the determined performance characteristics, the user may determine whether a battery is working properly, is defective, is of low quality, etc. In this regard, the user may determine whether it would be desirable to remove and replace a battery with a low battery charging efficiency from the battery-operated device rather than recharge the battery.

The user device 106 may receive information from the battery-operated devices 102A-G. In an aspect, the user device 106 may receive information associated with the battery or batteries of the battery-operated devices 102A-G. In some cases, such information may be transmitted by the battery-operated devices 102A-G upon request by the user device 106. For example, the user device 106 may have at least some portions of the security software application installed or otherwise accessible to the user device 106, and such security software application may provide a user interface that allows the user device 106 to monitor and request information from the battery-operated devices 102A-G.

In some cases, when a battery-operated device is being charged by the charging device 104, the battery-operated device may be set (e.g., by the user) to transmit a notification to the user device 106 when the battery-operated device is charged to a threshold charge level. For example, a notification may be set to be transmitted when the battery-operated device is fully charged. In some cases, the battery-operated device may be set to transmit a notification at each of multiple threshold charge levels (e.g., 50% charged, 70% charged, 90% charged, and/or fully charged).

In an embodiment, as an example application, the battery-operated devices 102A-G may be part of one or more surveillance systems. For example, the battery-operated devices 102A-C may be surveillance cameras (e.g., visible-light cameras and/or infrared cameras) that form, or may form a part of, a surveillance system 112 of a house. In some cases, the surveillance system 112 may include additional, fewer, and/or different devices not shown in FIG. 1. In this example, the battery-operated devices 102A-C may be set up (e.g., positioned) within the house, outside of the house, at various altitudes, and/or pointing in various directions to allow capture of scenes encompassed by their respective fields of view. The battery-operated devices 102A-C may be controlled via control signals from the user device 106 and/or a central controller device (not shown). For example, the user of the user device 106 may be an owner of the house and/or may have set up the surveillance system 112. The user device 106 may be a smartphone that can transmit control signals to and/or otherwise interface with the surveillance system 112, e.g. via a security software application installed on the user device 106. As an example, when the battery-operated device 102A is being charged by the charging device 104, the user device 106 may transmit a control signal to the battery-operated device 102A and/or charging device 104 to stop the charging process, e.g. to conserve power of the charging device 104.

In some cases, the devices 102A-C, 104, and 106 may have agreed upon parameters (e.g., packet format, user credentials, security keys, etc.) by which to allow encryption and decryption of packets communicated between the devices 102A-C, 104, and 106, authentication between the devices 102A-C, 104, and 106, and so forth. For instance, the charging device 104 may charge the battery-operated device 102A upon successful authentication of the battery-operated device 102A to the charging device 104. In some cases, the battery-operated devices 102A-C (and other devices) of the surveillance system 112 may have a shared security key that they may use to authenticate themselves to the charging device 104. The parameters may also include a charge level to which to charge the battery-operated devices 102A-C. For example, the charging process may be set to stop when the charge level reaches 80%, rather than 100%. The parameters may be determined (e.g., exchanged) as part of an association procedure, handshake procedure, calibration procedure, initial setup procedure, or any other procedure associated with setting up the devices 102A-C, 104, and/or 106. Such a procedure may be automated and/or manual (e.g., initiated and/or controlled by the user). In some cases, the procedure (e.g., setup procedure, association procedure) may be provided to the user via a user interface on a website and/or an application program displayed on the user device 106.

With respect to the surveillance system 112, the charging device 104 may include circuitry for storing of software updates, diagnostic tools, and/or instructions and/or providing or performing software updates, diagnostic tools, and/or instructions to/on battery-operated devices. In some cases, the software updates, diagnostic tools, and/or instructions may be provided to the charging device 104 by the user device 106 (e.g., via wired and/or wireless communications) and/or by a central controller device (e.g., provided by a manufacturer, a user, and/or an administrator of the surveillance system 112). The software update(s) may be for an operating system and/or other software operating on the battery-operated devices 102A-C.

As an example, as shown in FIG. 1, consider that the charging device 104 is mounted to the battery-operated device 102A. The battery-operated device 102A may authenticate to the charging device 104 at or around the time the charging device 104 is mounted to the battery-operated device 102A. Upon successful authentication, the charging device 104 may charge the battery-operated device 102A and provide the software update to the battery-operated device 102A. If authentication is not successful, the charging device 104 may transmit to the user device 106 a prompt that requests authorization to charge the battery-operated device 102A, and proceed to charge and provide the software update to the battery-operated device 102A upon receiving authorization.

Upon successful authentication or receiving authorization, the charging device 104 may provide the software update by transmitting the software update to the battery-operated device 102A and/or by allowing retrieval of the software update by the battery-operated device 102A. The battery-operated device 102A and/or the charging device 104 may determine whether the software update has already been installed on the battery-operated device 102A and push the software update onto the battery-operated device 102A when the software update has not previously been installed.

With reference to the above example, in some cases, charging of the battery-operated device 102A may be independent of the authentication. In these cases, the charging device 104 may charge the battery-operated device 102A regardless of whether the authentication is successful, and not provide the software update until authentication is successful. In this regard, the user may set the charging device 104 to allow charging independent of the authentication. For example, the user may desire to use the charging device 104 for its charging capabilities without needing to associate battery-operated devices to the charging device 104, but desire higher security with regard to data communications. As another example, the charging device 104 may cause the battery-operated device 102A to perform diagnostics when the charging device 104 is secured to the battery-operated device 102A. The battery-operated device 102A may perform (e.g., download, install) the software update and/or the diagnostic tools while the battery-operated device 102A is being charged by the charging device 104. In an aspect, actions to be performed by the battery-operated device 102A and/or the charging device 104 at or around the time the charging device 104 is mounted to the battery-operated device 102A may be set during an initial setup of the surveillance system 112.

In some cases, the charging device 104 may need to be set up separately for battery-operated devices (e.g., the battery-operated devices 102D-G) outside of (e.g., not part of) the surveillance system 112. The user may introduce/associate additional devices into the surveillance system 112, or dissociate devices from the surveillance system 112. The user may set security parameters that identify the battery-operated devices that the charging device 104 is authorized to charge. The user may set how the battery-operated devices and/or charging device 104 handle situations where the charging device 104 is not authorized to charge a battery-operated device to which the charging device 104 is secured and correctly aligned for charging. For example, the user may indicate that the charging device 104 does not charge any battery-operated devices that are not explicitly identified by the user (e.g., battery-operated devices the user did not associate to the charging device 104). As another example, the user may indicate that the charging device 104 is to transmit to the user device 106 a prompt that requests authorization to charge the battery-operated device, and proceed to charge the battery-operated device upon receiving authorization.

FIGS. 2A through 2D illustrate example configurations in which a charging device is configured to charge a battery-operated device in accordance with one or more embodiments of the present disclosure. For each of FIGS. 2A through 2D, not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an aspect, FIGS. 2A through 2D show side views of a battery-operated device and charging device.

Figure 2B:
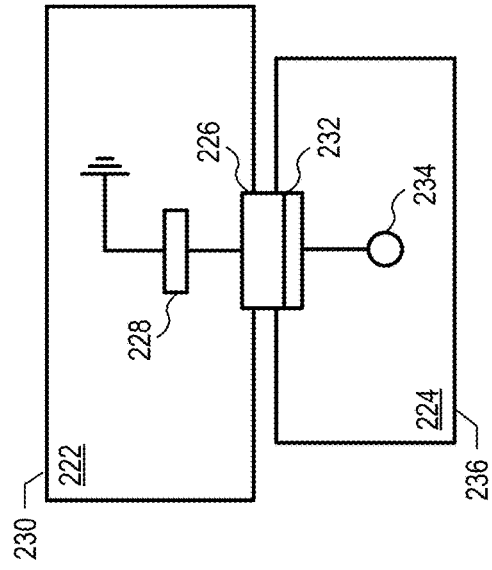
FIGS. 2A through 2D illustrate example configurations in which a charging device is configured to charge a battery-operated device in accordance with one or more embodiments of the present disclosure.
Figure 2D:
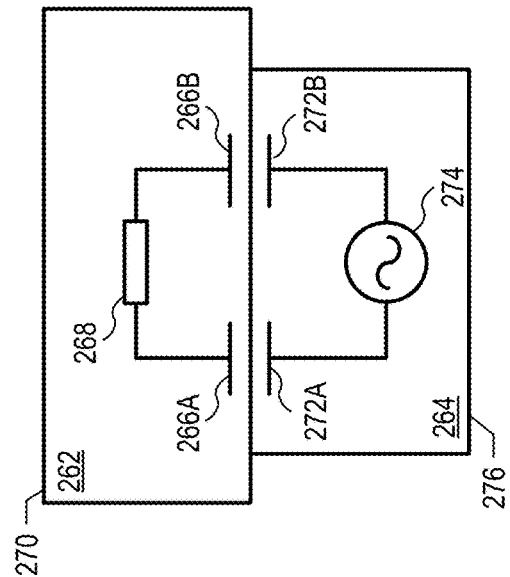
Figure 2A:
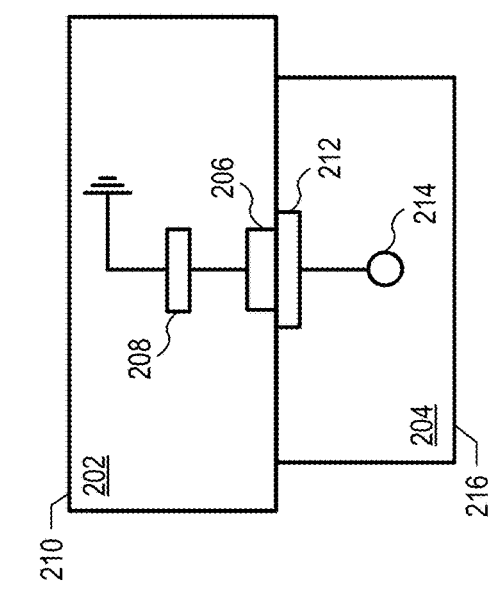

In FIG. 2A, the configuration includes a charging device 204 configured to charge a battery-operated device 202 via conductive contact between the battery-operated device 202 and the charging device 204. The battery-operated device 202 includes a conductive contact 206 (e.g., conductive plate, conductive electrode) and a load 208 within an enclosure 210. In an aspect, an enclosure may be referred to as a housing. The load 208 includes one or more rechargeable batteries. The charging device 204 includes a conductive contact 212 and a signal source 214 within an enclosure 216. When the charging device 204 is charging the battery-operated device 202, at least a portion of the conductive contacts 206 and 212 are in physical contact to allow conductive charging. In this regard, an exposed surface of the contacts 206 and 212 are flush with a surface of their respective enclosures 210 and 216, and the exposed surfaces are in physical contact to allow conductive charging. The conductive contacts 206 and 212 may be referred to as a charging interface or charging contact of the battery-operated device 202 and the charging device 204, respectively.

The signal source 214 may provide an alternating current (AC) and/or a direct current (DC) signal (e.g., AC and/or DC current, AC and/or DC voltage) to the load 208 via the conductive contacts 212 and 206. In some cases, such as when an AC signal is provided to the load 208, the load 208 may include a rectifier circuit(s) to convert the AC signal to a DC signal (e.g., DC voltage, DC current), and use the DC signal to charge the battery or batteries in the load 208.

The description of FIG. 2A generally applies to FIG. 2B, with examples of differences between FIGS. 2A and 2B and other description provided herein for purposed of clarity and simplicity. In FIG. 2B, the configuration includes a charging device 224 configured to charge a battery-operated device 222 via conductive contact between the battery-operated device 222 and the charging device 224. The battery-operated device 222 includes a conductive contact 226 (e.g., conductive plate, conductive electrode) and a load 228 within an enclosure 230. The load 228 includes one or more rechargeable batteries. The charging device 224 includes a conductive contact 232 and a signal source 234 within an enclosure 236. In FIG. 2B, a portion of the conductive contact 226 is within the enclosure 230 whereas a portion of the conductive contact 226 is outside of the enclosure 230. In this regard, a portion of the conductive contact 226 protrudes from the enclosure 230. In addition, the enclosure 236 is substantially rectangular, with a recess along a top surface to receive the conductive contact 226.

Figure 2C:
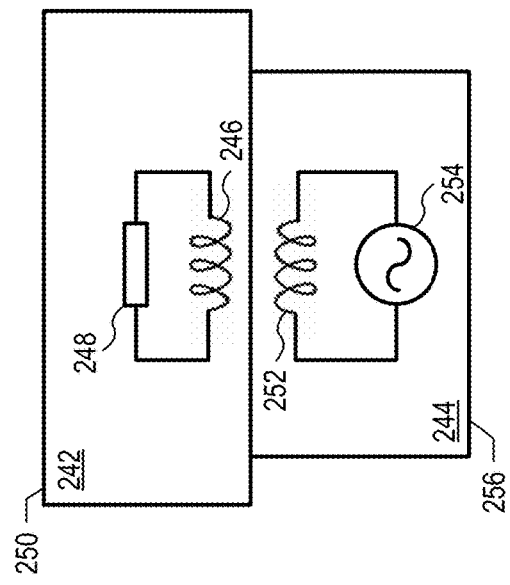

In FIG. 2C, the configuration includes a charging device 244 configured to charge a battery-operated device 242 via inductive coupling. The battery-operated device 242 includes a coil 246 (e.g., an inductor) and a load 248 within an enclosure 250. The load 248 includes one or more rechargeable batteries. The charging device 244 includes a coil 252 and a signal source 254 within an enclosure 256. In FIG. 2C, the coils 246 and 252 may be referred to as a charging interface of battery-operated device 242 and the charging device 244, respectively. In this regard, the charging interfaces of the devices 242 and 244 may inductively couple to each other to allow inductive charging.

When the charging device 244 is charging the battery-operated device 242, the coil 246 inductively couples to the coil 252. In particular, the signal source 254 may provide an AC current through the coil 252, which in turn induces an AC current through the coil 246. In this regard, the coils 246 and 252 form a transformer. The AC current may be provided to the load 248 to allow charging of the battery or batteries. In some cases, the load 248 may include a rectifier circuit(s) to convert the AC current to a DC signal (e.g., DC voltage, DC current). The battery or batteries in the load 248 can then be charged using the DC signal.

In FIG. 2D, the configuration includes a charging device 264 configured to charge a battery-operated device 262 via capacitive coupling. The battery-operated device 264 includes conductors 266A and 266B (e.g., metal plates, metal electrodes) and a load 268 within an enclosure 270. The load 268 includes one or more rechargeable batteries. The charging device 264 includes conductors 272A and 272B and a signal source 274 within an enclosure 276. In FIG. 2D, the conductors 266A and 266B may be referred to as charging interfaces of the battery-operated device 262, and the conductors 272A and 272B may be referred to as charging interfaces of the charging device 262, respectively. In this regard, the charging interfaces of the devices 262 and 264 may capacitively couple to each other to allow capacitive charging.

When the charging device 264 is charging the battery-operated device 262, the conductor 266A capacitively couples to the conductor 272A, and the conductor 266B capacitively couples to the conductor 272B. In this regard, the conductors 266A and 272A form a capacitor (e.g., a parallel-plate capacitor), and the conductors 266B and 272B form a capacitor, with intervening space between the conductors being a dielectric of the capacitors. The signal source 274 provides an AC voltage to the conductors 272A and 272B, which causes an alternating potential difference between the conductors 266A and 272A, and between the conductors 266B and 272B. The alternating potential difference provides an AC current that can be provided to the load 268 to allow charging of the battery or batteries. In some cases, the load 268 may include a rectifier circuit(s) to convert the AC current to a DC signal. The battery or batteries in the load 268 can then be charged using the DC signal. Although FIG. 2D shows an example configuration that utilizes a bipolar design in which two capacitors are formed, a unipolar design in which only one capacitor is formed to facilitate charging of the battery-operated device 262 may be utilized.

In some aspects, the load (e.g., 208, 228, 248, 268) of the battery-operated devices (e.g., 202, 222, 242, 262) may include, or may be coupled to, components such as voltage or current dividers/regulators, diodes, switches, etc. that may control voltage and/or current provided to charge the battery or batteries. In some aspects, the load may include a rectifier circuit(s) to convert AC signals to DC signals.

Variations to the configurations shown in FIGS. 2A through 2D are possible. As one example variation, although FIGS. 2A through 2D show devices with enclosures that have rectangular or substantially rectangular cross-sections, the devices may have enclosures of different shapes and/or sizes than those shown in FIGS. 2A through 2D. FIGS. 2A and 2B illustrate two example configurations with physical, conductive contacts. In one example variation, an entirety of the conductive contact 226 may be external to the enclosure 230. In another variation, a portion of the conductive contact 232 may be external to the enclosure 236.

FIGS. 2C and 2D illustrate example configurations with indirect contact between a charging interface(s) of a charging device and a battery-operated device. In an aspect, an indirect contact may be referred to as wireless contact or wire-free contact. Although in FIGS. 2C and 2D illustrate the indirect contacts as being within an enclosure, in some cases, at least a portion of some of the indirect contacts (e.g., the coil 246, the conductor 272A) of the charging device and/or the battery-operated device may be external to the enclosure. In an aspect, with respect to inductive coupling (e.g., FIG. 2C) and capacitive coupling (e.g., FIG. 2D), the charging interface of the battery-operated device and/or the charging interface of the charging device may include a resonant circuit to allow resonant inductive coupling or resonant capacitive coupling. Resonant coupling may expedite the charging process and/or allow energy to be transported over a longer distance between the charging interfaces.

It is noted that FIGS. 2A through 2D provide non-limiting examples of configurations in which a charging device may charge a battery-operated device. Other configurations and/ or manners by which to allow charging through direct or indirect contact (e.g., inductive or capacitive coupling) of the battery-operated device by the charging device may be utilized.

In some cases, the charging device and/or the battery-operated device may have multiple charging interfaces. For example, the charging device may have one or more charging interfaces for inductive charging (e.g., FIG. 2C) and one or more charging interfaces for conductive charging (e.g., FIGS. 2A and/or 2B). In some cases, the charging device may charge the battery-operated device using one of the charging device's charging interfaces for conductive charging, while not using the other charging interfaces to charge the battery-operated device. When the battery-operated device and charging device have a different number and/or different types of charging interfaces, the magnetic element(s) of the battery-operated device and/or the charging device may help align at least the charging interface(s) that are being utilized for charging.

In an embodiment, charging devices and battery-operated devices shown in FIGS. 2A through 2D may be, may include, or may be a part of, the charging device 104 and battery-operated devices 102A-G, respectively, shown in FIG. 1. In some cases, the battery-operated devices shown in FIGS. 2A through 2D may be, may include, or may be a part of the user device 106. In an aspect, to facilitate or allow charging of the battery-operated device, the charging device is secured to the battery-operated device.

FIGS. 3A through 3D illustrate example configurations in which a charging device is secured to a battery-operated device in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

In some aspects, securing the charging device to the battery-operated device facilitates charging of the battery-operated device by the charging device. For instance, the charging device may be secured to facilitate alignment of charging interface(s) of the charging device with charging interface(s) (e.g., compatible charging interface(s)) of the battery-operated device to allow efficient power transfer.

Figure 3B:
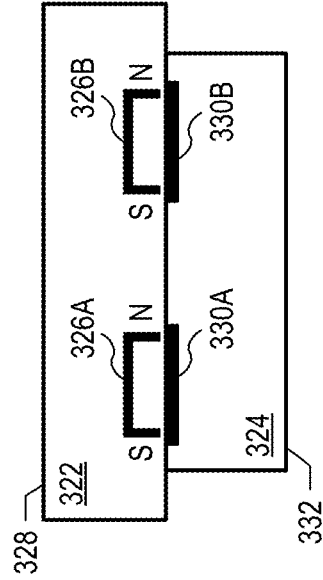
FIGS. 3A through 3D illustrate example configurations in which a charging device is secured to a battery-operated device in accordance with one or more embodiments of the present disclosure.
Figure 3D:
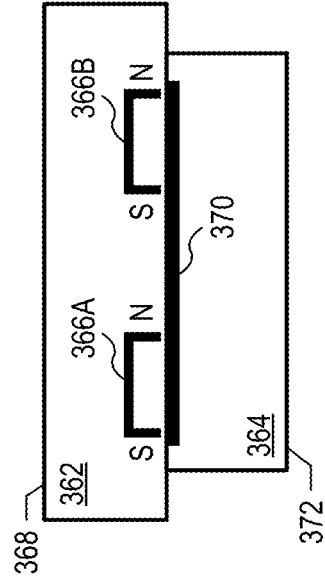
Figure 3A:
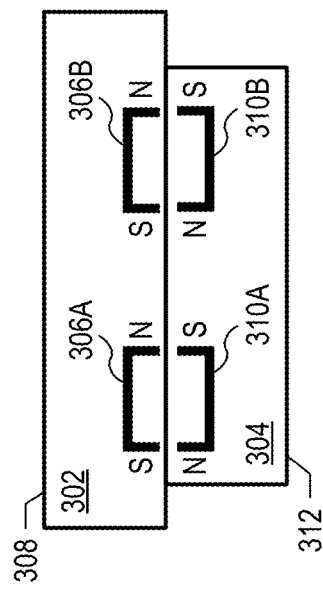

In FIG. 3A, the configuration includes a charging device 304 secured to a battery-operated device 302. The battery-operated device 302 includes magnetic materials 306A and 306B within an enclosure 308. The magnetic materials 306A and 310A are magnets that can be oriented to attract each other (e.g., north pole of 306A is attracted to south pole of 310A, and vice versa), and similarly the magnetic materials 306B and 310B are magnets that can be oriented to attract each other. In this manner, the magnetic materials 306A, 306B, 310A, and 310B may allow the charging device 304 to be secured to the battery-operated device 302. For example, when the battery-operate device 302 and charging device 304 are suspended off the ground with the charging device 304 secured to a bottom portion of the battery-operated device 302, the magnetic materials 306A, 306B, 310A, and 310B allow the battery-operated device 302 to support the weight of the charging device 304.

In an aspect, when the charging device 304 is being mounted to the battery-operated device 302, the poles of the magnetic materials 306A and 306B may help align the magnetic materials 310A and 310B. For instance, when the user brings the charging device 304 in proximity to the battery-operated device 302, the magnetic materials 306A and 306B may repel the magnetic materials 310A and 310B when the poles of the magnetic materials 306A and 310A, and/or the poles of the materials 306B and 310A, are misaligned. In some cases (e.g., based on manufacturer design), if the user aligns only one pair of magnetic materials, such as aligning the magnetic material 306B with the magnetic material 310A, the charging device 304 is not secured to the battery-operated device 302. In other cases, aligning only one out of the two pairs of magnetic materials may be sufficient to secure the charging device 304 to the battery-operated device 302.

FIG. 3B illustrates an example configuration in which a charging device 324 is secured to a battery-operated device 322. The battery-operated device 322 includes magnetic materials 326A and 326B within an enclosure 328. The charging device 324 includes magnetic materials 330A and 330B within an enclosure 332. In FIG. 3B, the magnetic materials 326A and 326B are magnets, and the magnetic materials 330A and 330B are materials (e.g., metal plates) that can attract and/or be attracted to the magnetic materials 326A and 326B. In this regard, the magnetic materials 326A, 326B, 330A, and 330B may allow the charging device 324 to be secured to the battery-operated device 322.

In some cases, the magnetic materials 330A and 330B may be interchangeable, such that the magnetic materials 330A and 330B may be reversed relative to that shown in FIG. 3B, e.g. the magnetic material 330B is on the left and the magnetic material 330A is on the right. In these cases, for instance, charging interfaces of the battery-operated device 322 and the charging device 324 are correctly aligned for charging regardless of whether the magnetic materials 330A and 330B are situated as shown in FIG. 3B or flipped relative to the arrangement shown in FIG. 3B (e.g., with the magnetic material 330A on the right and the magnetic material 330B on the left). In other cases, the magnetic materials 310A and 310B are not interchangeable, such that for correct charging alignment the magnetic material 306A couples to the magnetic material 310A and the magnetic material 306B couples to the magnetic material 310B.

Figure 3C:
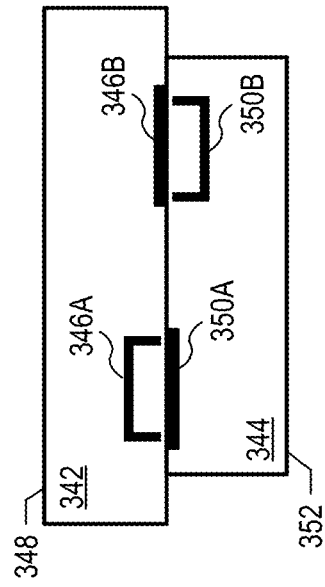

FIG. 3C illustrates an example configuration in which a charging device 344 is secured to a battery-operated device 342. The battery-operated device 342 includes magnetic materials 346A and 346B within an enclosure 348. The charging device 344 includes magnetic materials 350A and 350B within an enclosure 352. In FIG. 3C, the magnetic materials 346A and 350B are magnets, and the magnetic materials 346B and 350A are materials (e.g., metal plates) that can be attracted to the magnetic materials 346A and 350B, respectively. In this regard, the magnetic materials 346A, 346B, 350A, and 350B may allow the charging device 344 to be secured to the device 342.

FIG. 3D illustrates an example configuration in which a charging device 364 is secured to a battery-operated device 362. The battery-operated device 362 includes magnetic materials 366A and 366B within an enclosure 368. The charging device 364 includes a magnetic material 370 within an enclosure 372. In FIG. 3D, the magnetic materials 366A and 366B are magnets, and the magnetic material 370 is a material that can attract and/or be attracted to the magnetic materials 366A and 366B. In this regard, the magnetic materials 366A, 366B, and 370 may allow the charging device 344 to be secured to the device 342.

In some aspects, charging of the battery-operated device by the charging device occurs when the charging device is secured to the battery-operated device such that at least one charging interface of the battery-operated device is coupled to at least one suitable/compatible charging interface of the charging device. For instance, charging interfaces of the charging device and battery-operated device may be considered suitable/compatible for each other when they can be aligned and are of the same type (e.g., inductive, capacitive, conductive). In this regard, the charging device may be designed with the size, shape, magnetic element(s) positioning, and/or charging interface(s) positioning of the battery-operated device in mind, and/or vice versa. In some cases, the magnetic material(s) and/or charging interface(s) of the charging device and/or the battery-operated device may be oriented to increase the number of ways to correctly align the charging interface(s), which may allow the user to more easily attach the charging device to the battery-operated device.

Although the magnetic materials are within the enclosures in FIGS. 3A through 3D, in some cases at least a portion of the magnetic material(s) of the charging device and/or the battery-operated device may be external to the enclosure. Furthermore, although FIGS. 3A through 3D are described with reference to securing a charging device to a battery-operated device, the charging device may be secured to generally any device with magnetic material to attract the charging device and/or be attracted to the charging device. For example, the charging device may be attached to a refrigerator door when not in use.

In an embodiment, charging devices and battery-operated devices shown in FIGS. 3A through 3D may be, may include, or may be a part of, the charging device 104 and battery-operated devices 102A-G, respectively, shown in FIG. 1. In some cases, the battery-operated devices shown in FIGS. 3A through 3D may be, may include, or may be a part of the user device 106. In an aspect, charging interfaces of the charging devices and battery-operated devices shown in FIGS. 3A through 3D may be coupled using any one or more of the configurations shown in FIGS. 2A through 2D.

Figure 4:
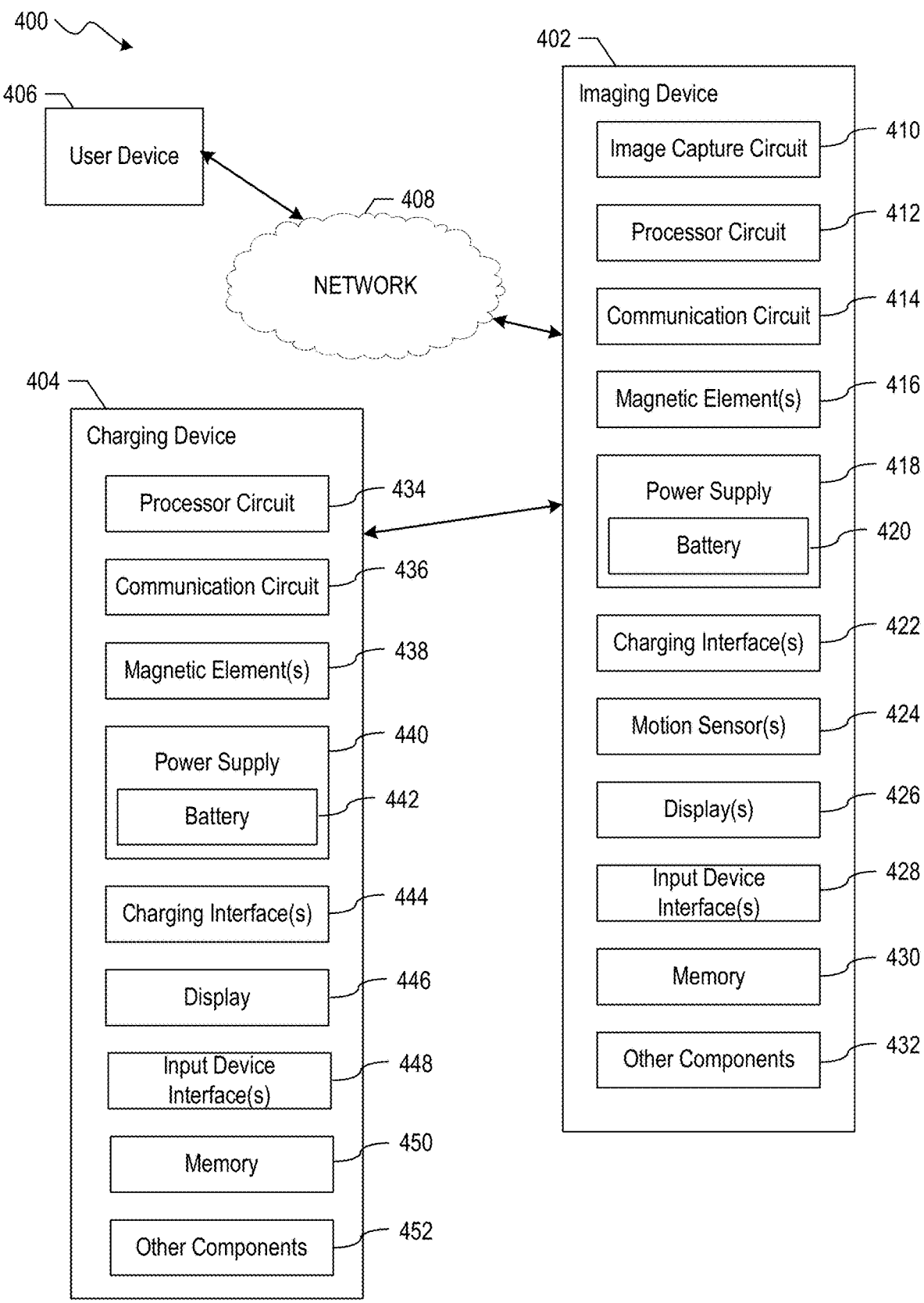
FIG. 4 illustrates an example network environment for facilitating wireless charging of devices in accordance with one or more embodiments of the present disclosure.

FIG. 4 illustrates an example network environment 400 for facilitating wireless charging of devices in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The network environment 400 includes an imaging device 402, a charging device 404, a user device 406, and a network 408. In an embodiment, the imaging device 402 may be, may include, or may be a part of, any one of the battery-operated devices 102A-G shown in FIG. 1. In an embodiment, the charging device 404 may be, may include, or may be a part of, the charging device 104 shown in FIG. 1. In an embodiment, the user device 406 may be, may include, or may be a part of the user device 106 shown in FIG. 1. In an embodiment, the network 408 may be, may include, or may be a part of, the network 108 shown in FIG. 1.

The imaging device 402 includes an image capture circuit 410, a processor circuit 412, a communication circuit 414, a magnetic element(s) 416, a power supply 418, a charging interface(s) 422, a motion sensor(s) 424, a display 426, an input device interface 428, a memory 430, and/or other components 432. The image capture circuit 410 may be configured to capture (e.g., detect, sense) electromagnetic (EM) radiation from scenes. The image capture circuit 410 may include one or more thermal sensors (e.g., infrared camera) and/or one or more visual sensors (e.g., visible-light camera or video camera). For example, the image capture circuit 410 may include a thermal sensor formed of a focal plane array (FPA) of microbolometers. The microbolometers may detect infrared (IR) radiation in a scene in the form of heat energy and generate pixel values based on the amount of heat energy detected. As another example, alternatively or in addition, the image capture circuit 410 may include a visible-light camera that can capture a scene as a visible-light image.

The processor circuit 412 may perform operations to process the pixel values received from the image capture circuit 410. By way of non-limiting example, the processor circuit 412 may perform operations such as non-uniformity correction (NUC), spatial and/or temporal filtering, and/or radiometric conversion on the pixel values. In some embodiments, the processor circuit 412 may perform operations for facilitating charging of the imaging device 402 by the charging device 404 (and/or other charging devices). In this regard, the processor circuit 412 may perform operations to authenticate the imaging device 402 to the charging device 404 and/or user device 406 and process packets being communicated between the devices 402, 404, and/or 406.

The processor circuit 412 may determine whether the imaging device 402 is compatible with the charging device 404. In an aspect, the imaging device 402 may be considered to be compatible with the charging device 404 if at least one charging interface of the charging device 404 is able to provide power to at least one charging interface of the imaging device 402, if the charging device 404 is capable of being secured to the imaging device 402, and/or if the imaging device 402 is able to successfully authenticate to the charging device 404, and/or vice versa. In some cases, the imaging device 402 and the charging device 404 (and other devices) may be part of a common system/application (e.g., surveillance system, sensor system), such that the imaging device 402 and charging device 404 are designed with size, shape, magnetic element(s) positioning, and charge interface(s) positioning compatible with each other.

In some cases, when the charging device 404 is in communication with the imaging device 402 (such as when the charging device 404 is secured to and thus in proximity of the imaging device 402), the processor circuit 412 may determine whether a software update is available in the charging device 404 and, if so, facilitate obtaining of the software update (e.g., via the communication circuit 414). In some cases, alternatively or in addition, when the charging device 404 is in communication with the imaging device 402, the processor circuit 412 may perform diagnostics based on diagnostic tools and/or instructions contained in the charging device 404.

The communication circuit 414 may be configured to handle, manage, or otherwise facilitate wired and/or wireless communication between various components of the imaging device 402 and another device, such as the charging device 404 and/or user device 406. As an example, the imaging device 402 may communicate with the charging device 404 directly, e.g. via a wired connection or wireless connection, such as receiving via the communication circuit 414 a software update transmitted by the charging device 404. As another example, the imaging device 402 may communicate with the user device 406 via the network 408 using the communication circuit 414, such as to transmit a status of remaining battery power of the imaging device 402.

In an embodiment, the communication circuit 414 may include a wireless communication circuit (e.g., based on the IEEE 802.11 standard, Bluetooth™ standard, ZigBee™ standard, or other wireless communication standard), cellular circuit, or other appropriate communication circuit. In some cases, the communication circuit 414 may be configured for a proprietary wireless communication protocol and interface. The communication circuit 414 may include, or may be in communication with, an antenna for wireless communication. Thus, in one embodiment, the communication circuit 414 may handle, manage, or otherwise facilitate wireless communication by establishing a wireless link to a handheld device, base station, wireless router, hub, or other wireless networking device.

The communication circuit 414 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 414 may support proprietary wired communication protocols and interfaces. The communication circuit 414 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The magnetic element(s) 416 may include magnets, ferromagnetic materials, and/or generally any magnetic material that can magnetically attract other materials (e.g., metal materials) and/or be magnetically attracted to magnetic materials. The magnetic element(s) 416 may allow the charging device 404 to be secured to the imaging device 402, e.g. to facilitate charging of the imaging device 402 by the charging device 404. The magnetic element(s) 416 may couple to a magnetic element(s) 438 of the charging device 404 to secure the charging device 404 to the imaging device 402.

The power supply 418 may supply power to operate the imaging device 402, such as by supplying power to the various components (e.g., components 410, 412, 414, 420, 422, 424, 426, 428, 430, and/or 432, etc.) of the imaging device 402. The power supply 416 may be, or may include, one or more batteries (e.g., rechargeable batteries, non-rechargeable batteries), including a rechargeable battery 420. The battery 420 may be a lithium ion battery, lithium polymer battery, nickel cadmium battery, nickel metal hydride battery, and/or any other battery suitable to supply power to operate the power supply 418. In some cases, the power supply 418 may be, or may include, one or more solar cells. The solar cells may be utilized to supply power to operate the imaging device 402 and/or to charge one or more rechargeable batteries (e.g., to prolong a time duration before the charging device 404 is needed to recharge the batteries). In an embodiment, the power supply 418 may be, or may include, at least one battery (e.g., the battery 420) that may be configured to be recharged by the charging device 404.

The power supply 418 may be configured to receive power from the charging device 404 via one or more charging interfaces 422. The charging interface(s) 422 may couple to a charging interface(s) 444 of the charging device 404 to charge the imaging device 402 (e.g., charge the battery 420). In some cases, the magnetic element(s) 416 and 438 may help align the charging interface(s) 422 of the imaging device 402 with the charging interface(s) 444 of the charging device 404 to allow charging of the imaging device 402. In an aspect, the charging interface(s) 422 and 444 may be in contact directly or indirectly. As an example of direct contact, the charging interface 422 and the charging interface 444 may be charging contacts (e.g., metal electrodes, metal plates) that are in direct physical contact.

The motion sensor(s) 424 may be implemented by one or more accelerometers, gyroscopes, and/or other appropriate devices that may be used to detect movement of the imaging device 402. In an embodiment, information provided by the motion sensor(s) 424 may facilitate operations (e.g., object detection, spatial filtering, temporal filtering) performed by the processing circuit 412, such as by facilitating differentiation between motion of objects in the scene relative to motion of the imaging device 402. In some cases, the motion sensor(s) 424 may be implemented as part of the imaging device 402 and/or in other device(s) attached to or otherwise interfaced with the imaging device 402.

The display 426 (e.g., screen, touchscreen, monitor) may allow the imaging device 402 to display information associated with the captured scene and/or the power supply 418. In some cases, the display 426 may be utilized to display a battery level of the battery 420 and/or an indication of whether the battery 420 is being charged. The display 426 may be utilized to display a message to the user. For example, the message may be displayed to the user when the imaging device 402 fails to authenticate to the charging device 404, and/or vice versa, after a threshold number of attempts, and indicate such failure. The message may provide a prompt requesting the user to authorize or not authorize charging of the imaging device 402 by the charging device 404 and/or receiving a software update from the charging device 404. As another example, the message may be displayed to the user to indicate that the imaging device 402 is not compatible with the charging device 404. In some cases, the user device 406 may be utilized as a display for the imaging device 402, such that the communication circuit 414 may transmit the message for display on the user device 406 alternative to or in addition to displaying the prompt on the display 426.

In an aspect, the display 426 may be, or may include, one or more indicator lights, such as light-emitting diode (LED) lights, that can indicate whether the battery 420 is low on power and/or is being charged. In an aspect, alternatively or in addition, the display 426 may be, or may include, one or more indicator lights to indicate whether a charging device (e.g., the charging device 404) is charging the imaging device 402 and, if not, indicate a possible reason why the charging device is not charging the imaging device 402. The indicator light(s) may indicate that the imaging device 402 failed in the authentication process, the charging device is not attached properly, the charging device is not compatible with the imaging device 402, and/or other reasons, e.g., using different arrangement/number of turned on lights and/or different colors of light.

The input device interface 428 may allow the user to communicate information to the imaging device 402. Input devices that may be used with the input device interface 428 may include, for example, alphanumeric keyboards and pointing devices. An input device may be included in the imaging device 402 or otherwise connected to the imaging device 402 via the input device interface 428. In some cases, the input device may be a virtual keyboard provided for display using the display 426. In some cases, the input device interface 428 may allow the imaging device 402 to receive a user input in response to a prompt displayed to the user. In some cases, the user device 406 may be considered an input device. The user device 406 may provide control signals (e.g., responses to prompts) to the imaging device 402.

The memory 430 may be utilized to store information for facilitating operation of the imaging device 402. By way of non-limiting example, the memory 430 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 430 may include volatile memory, such as random-access memory (RAM), dynamic RAM (DRAM), static RAM (SRAM), etc. The memory 430 may store instructions to be executed by the various components (e.g., the image capture circuit 410, the processor circuit 412) of the imaging device 402, installed software, information pertaining to diagnostic results, image/video information captured by the imaging device 402, security-related information (e.g., security keys, credentials), and/or other information.

In addition, the imaging device 402 may include other components 432. By way of non-limiting example, the other components 432 may be used to implement any features of the imaging device 402 as may be desired for various applications (e.g., clock generators, temperature sensors, and/or other components). The other components 432 may include components of the imaging device 402 unrelated to capturing/processing scenes and/or charging of the imaging device 402.

The charging device 404 includes a processor circuit 434, communication circuit 436, magnetic element(s) 438, power supply 440, charging interface(s) 444, display 446, input device interface(s) 448, memory 450, and other components 452. The description of the various components of the imaging device 402 (e.g., the processor circuit 412, the communication circuit 414) generally applies to corresponding components of the charging device 404 (e.g., the processor circuit 434, the communication circuit 436).

The processor circuit 434 may perform operations associated with charging of a battery-operated device (e.g., the imaging device 402) by the charging device 404. For example, the processor circuit 434 may determine whether the imaging device 402 is compatible with the charging device 404. The processor circuit 434 may perform operations associated with authentication with the imaging device 402, e.g. when the imaging device 402 is in proximity or attached to the charging device 404. In this regard, the imaging device 402 may authenticate to the charging device 404, and/or vice versa.

The communication circuit 436 may include a wireless communication circuit to allow communication with the imaging device 402 and/or the user device 406. In some cases, the communication circuit 436 may have different communication capability relative to the imaging device 402 and/or the user device 406. For example, the communication circuit 436 may utilize close-range communications, such as Bluetooth™, ZigBee™, and/or NFC-based communications. In other cases, the communication circuit 436 may be capable of other wireless communication technologies.

The magnetic element(s) 438 may include magnets, ferromagnetic materials, and/or generally any magnetic material that can magnetically attract other materials (e.g., metal materials) is and/or be magnetically attracted to magnetic materials. The magnetic element(s) 438 may couple to a magnetic element(s) 416 of the imaging device 402 to secure the charging device 404 to the imaging device 402.

The power supply 440 may supply power to operate the imaging device 402, such as by supplying power to the various components (e.g., components 434, 436, 446, 448, 450, and/or 452, etc.) of the charging device 404. In addition, the power supply 440 may be configured to transmit power to the imaging device 402 via one or more charging interfaces 444 when the charging device 402 is correctly aligned with the imaging device 402. In some cases, the user device 406 may also be compatible with the charging device 404, in which the user device 406 includes a charging interface that allows the user device 406 to be charged by the charging device 404.

The power supply 440 may be, or may include, one or more batteries (e.g., rechargeable batteries, non-rechargeable batteries), including a rechargeable battery 442. The batteries may be a lithium ion battery, lithium polymer battery, nickel cadmium battery, nickel metal hydride battery, and/or any other battery suitable to supply power to operate the power supply 440. In some cases, the power supply 440 may be, or may include, one or more solar cells. The solar cells may be utilized to supply power to operate the charging device 404 and/or to charge one or more rechargeable batteries (e.g., to prolong a time duration before the charging device 404 needs to be recharged). In an aspect, the battery 442 (and other batteries) may be recharged by obtaining power (e.g., via wired or wireless transfer) from an external power source, such as another charging device or an electrical wall outlet.

The display 446 (e.g., screen, touchscreen, monitor) may allow the charging device 404 to display information associated with a battery level of the battery 442 and/or an indication of whether the charging device 404 is being used to charge another device (e.g., the imaging device 402). The display 446 may be utilized to display a message to the user. The message may be provided to the user when the imaging device 402 fails to authenticate to the charging device 404, and/or vice versa, after a threshold number of attempts. The message may provide a prompt requesting the user to authorize or not authorize charging of the imaging device 402 by the charging device 404 and/or transmitting a software update from the charging device 404. The message may be displayed to the user if the imaging device 402 is not compatible with the charging device 404. In an aspect, the display 426 may be, or may include, one or more indicator lights. In an aspect, the user device 406 may be utilized as a display for the imaging device 402.

The input device interface 448 may allow the user to communicate information to the charging device 404. Input devices that may be used with the input device interface 448 may include, for example, alphanumeric keyboards and pointing devices. An input device may be included in the charging device 404 or otherwise connected to the charging device 404 via the input device interface 428. In some cases, the input device may be a virtual keyboard provided for display using the display 426. In some cases, the input device interface 428 may allow the charging device 404 to receive a user input in response to a prompt displayed to the user. In some cases, the user device 406 may be considered an input device. The user device 406 may provide control signals (e.g., responses to prompts) to the charging device 404.

The memory 450 may be utilized to store information for facilitating operation of the charging device 404. By way of non-limiting example, the memory 450 may include non-volatile memory (e.g., EEPROM, flash) and/or volatile memory (e.g., RAM). The memory 450 may store instructions to be executed by the various components (e.g., the processor circuit 434) of the charging device 404 and/or imaging device 402 (or other devices to which the charging device 404 may be used to charge), software updates, diagnostic software/tools, installed software, information pertaining to diagnostic results, security-related information (e.g., security keys, credentials), and/or other information.

In addition, the charging device 404 may include other components 452. By way of non-limiting example, the other components 452 may be used to implement any features of the charging device 404 as may be desired for various applications (e.g., clock generators, temperature sensors, and/or other components). For example, the temperature sensors of the charging device 404 may detect a temperature associated with the battery 420. A rate at which to charge the battery 420 may be based at least in part on the detected temperature. In some cases, the other components 452 may include components of the charging device 404 unrelated to charging other devices.

Although FIG. 4 illustrates an example of a charging device (e.g., the charging device 404) that includes memory for holding software updates and/or diagnostic tools and a communication circuit to facilitate providing of software or software updates to the imaging device 402, the charging device may include fewer, more, and/or different components. In some cases, the charging device solely provide charging capability, e.g. without providing any software to the imaging device 402). In addition, although the charging device 404 is utilized to charge an imaging device (e.g., the imaging device 402), the charging device 404 may generally be utilized to charge any compatible battery-operated device. Similarly, the imaging device 402 may include fewer, more, and/or different components. For example, in some cases, the imaging device 402 does not include a display, and/or may use a display of the user device 406 to communicate with the user.

Figure 5A:
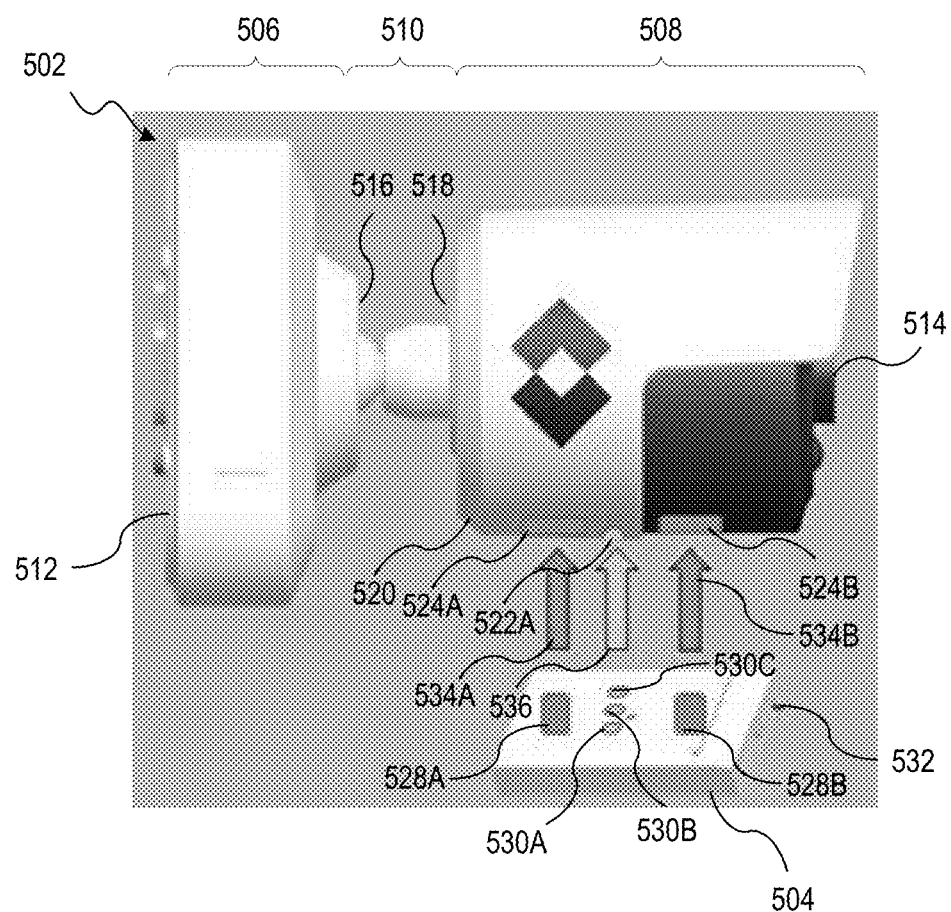
FIG. 5A illustrates an example configuration that includes an imaging device capable of being charged by a charging device in accordance with one or more embodiments of the present disclosure.
Figure 5B:
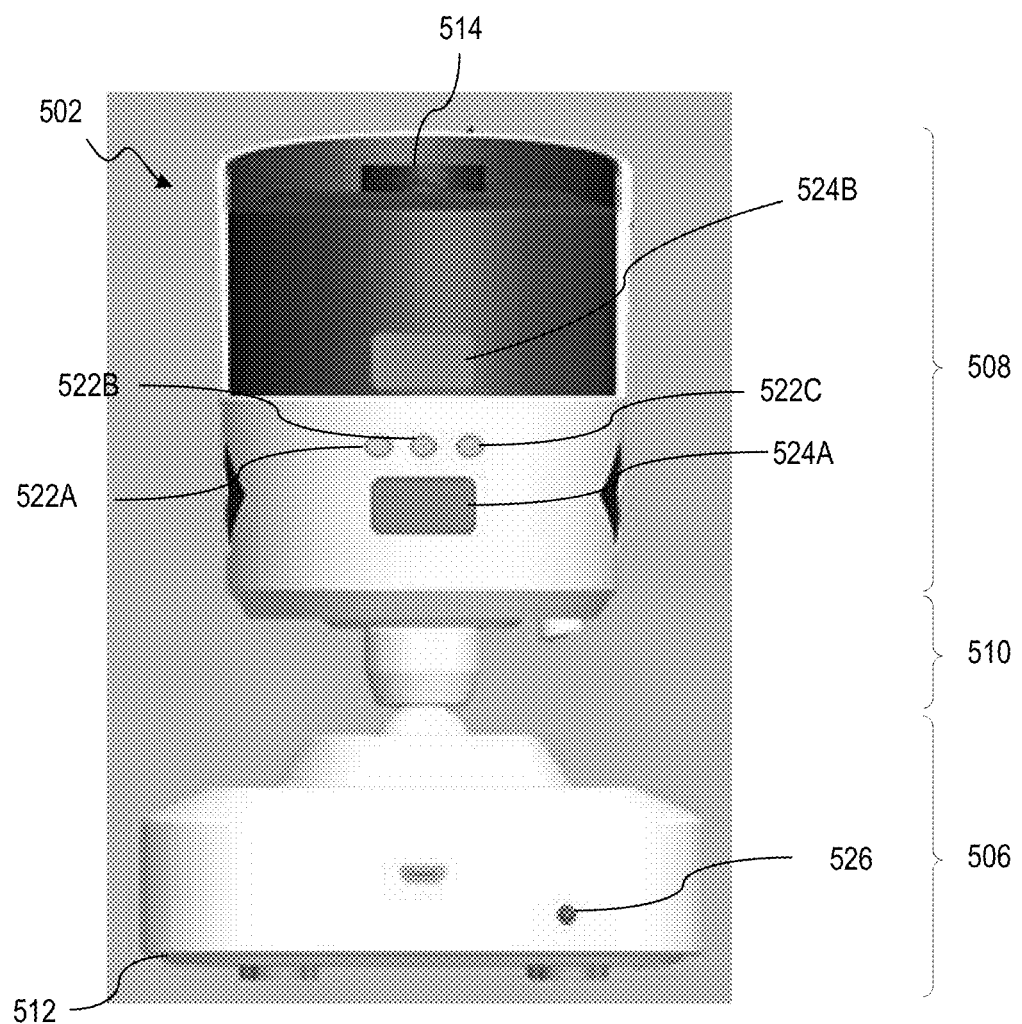
FIG. 5B illustrates a bottom view of the imaging device of FIG. 5A in accordance with one or more embodiments of the present disclosure.

FIG. 5A illustrates an example configuration that includes an imaging device 502 capable of being charged by a charging device 504 in accordance with one or more embodiments of the present disclosure. FIG. 5A illustrates a side view of the configuration. FIG. 5B illustrates a bottom view of the imaging device 502 in accordance with one or more embodiments of the present disclosure. Not all of the depicted components may be required, however, and one or more embodiments may include additional components not shown in the figures. Variations in the arrangement and type of the components may be made without departing from the spirit or scope of the claims as set forth herein. Additional, fewer, and/or different components may be provided.

The imaging device 502 includes a base portion 506, an imaging portion 508, and an interconnect portion 510 to connect the base portion 506 to the imaging portion 508. The base portion 508 includes an interface 512 to facilitate mounting of the imaging device 502 to a structure, such as a wall, pole, desktop, etc., through use of nails, screws, screw anchors, adhesives, etc. In some cases, the base portion 506 may be mounted onto/into a mounting structure attached to a wall, pole, desktop, etc.

The base portion 506 includes an indicator light 526. The indicator light 526 may be utilized to indicate when battery level of the imaging device 502 is low, to indicate that the imaging device 502 is being charged, to indicate that the imaging device 502 is installing a software update, to indicate error messages such as the imaging device 502 being incompatible with the charging device 504, and/or other status associated or not associated with the battery or batteries of the imaging device 502.

The imaging portion 508 may include the detector components (e.g., FPA and associated circuitry) to capture an image of the scene. The imaging portion 508 includes imaging components 514 for receiving/capturing images of a scene. The imaging components 514 may include one or more lenses, one or more apertures, and/or one or more shutters to control the receiving/capturing of images.

In FIGS. 5A and 5B, the imaging portion 508 may include charging interfaces 522A-C, and magnetic elements 524A-B close to or along a surface 520 (e.g., bottom surface) of the imaging portion 508. The magnetic elements 524A-B may be configured (e.g., designed with sufficient magnetic strength) to engage with and secure the charging device 504 to the imaging device 502. For example, the magnetic elements 524A-B may support the weight of the charging device 504 even when the charging device 504 is suspended off the ground. In some cases, the magnetic elements 524A-B may help align the imaging device 502 with the charging device 504 to facilitate charging of the imaging device 502 (e.g., charging of one or more batteries of the imaging device 502) by the charging device 504. For example, in operation, the imaging device 502 may be a surveillance camera mounted on a wall of a building around 10 feet to around 15 feet off the ground. The user may easily secure the charging device 504 to the surface 520 to facilitate charging of the imaging device 502 by charging device 504 and remove the charging device 504 once the imaging device 502 is sufficiently charged.

In this regard, the charging device 504 includes magnetic elements 528A-B and charging interfaces 530A-C. In FIGS. 5A and 5B, the charging interfaces 522A-C and 530A-C may be charging contacts, such that power can be transferred from the charging device 504 to the imaging device 502 via the charging interfaces 522A-C and 530A-C when the charging interfaces 522A-C and 530A-C are in physical contact. The magnetic elements 524A and 524B may couple to the magnetic elements 528A and 524B, respectively, and the charging interfaces 522A, 522B, and 522C may couple to the charging interfaces 530A, 530B, and 530C, respectively. In some cases, the orientation of the charging device 504 may be reversed from that shown in FIG. 5A while still allowing the charging device 504 to be secured to the imaging device 502 and the imaging device 502 to be charged by the charging device 504.

The charging device 504 includes an indicator light 532. The indicator light 532 may be utilized to indicate when battery level of the charging device 504 is low, to indicate that the charging device 504 is being used to charge another device, to indicate that the charging device 504 is providing a software update, to provide error messages such as the imaging device 502 being incompatible with the charging device 504, and/or other status associated or not associated with the battery or batteries of the charging device 504.

Arrows 534A and 534B may represent an attractive force exerted by the magnetic elements 524A and 524B, respectively, on the magnetic elements 528A and 528B. Arrow 536 may represent a direction of power flow to be effectuated once the charging device 504 is secured to the imaging device 502.

In some cases, a field of view of the imaging device 502 may be fixed. In other cases, the field of view is not fixed. For example, the imaging device 502 may have pan-tilt-zoom (PTZ) capability to allow tuning of its field of view. As one example, the base portion 506, imaging portion 508, interconnection portion 510, and/or components thereof may be adjustable (e.g., movable, rotatable) to allow changing of the field of view of the imaging device 502. Adjustability may be through mechanical adjustment effectuated through human adjustment of the imaging device 502 and/or adjustment via electrical control signals from circuitry in the base portion 506, imaging portion 508, and/or interconnect portion 510. In some cases, one or more of the base portion 506, imaging portion 508, and/or interconnection portion 510 may be fixed in position/orientation while other portions may be adjustable. In some cases, the field of view may be adaptively changed based on detection of an object (e.g., to trace movement of the object).

The base portion 506, imaging portion 508, and interconnect portion 510 are labeled as three separate portions in FIGS. 5A and 5B. In an aspect, two or more of the base portion 506, imaging portion 508, and interconnect portion 510 may be manufactured as a single piece, rather than manufactured as separate pieces that are then assembled (e.g., connected) together. In an embodiment, the imaging device 502 and/or the charging device 504 may be, may include, or may be a part of the imaging device 402 and charging device 404, respectively, shown in FIG. 4. In such a case, the various components (e.g., 410, 412, 414, 416, 418, 420, 422, 424, 426, 428, 430, 432) of the imaging device 402 may be distributed throughout one or more of the portions 506, 508, and 510 of the imaging device 502. Similarly, the various components of the charging device 404 may be distributed throughout the charging device 504.

It is noted that FIGS. 5A and 5B show one example of the positioning of the magnetic elements and charging interfaces of the imaging device 502 and the charging device 504. The magnetic elements and charging interfaces may be positioned differently from that shown in FIGS. 5A and 5B. For example, in FIGS. 5A and 5B, the imaging device 502 has magnetic elements and charging interfaces along a bottom surface of the imaging portion 508. In some cases, different and/or additional surfaces of the imaging portion 508 may be provided with magnetic elements and charging interfaces to allow securing of and charging by the charging device 504. In some cases, alternatively or in addition, magnetic elements and charging interfaces may be provided in the base portion 506 and/or interconnect portion 510. In some cases, the number of magnetic elements and/or the number of charging interfaces of the imaging device 502 may be different from the number of magnetic elements and/or the number of charging interfaces of the charging device 504.

Figure 6:
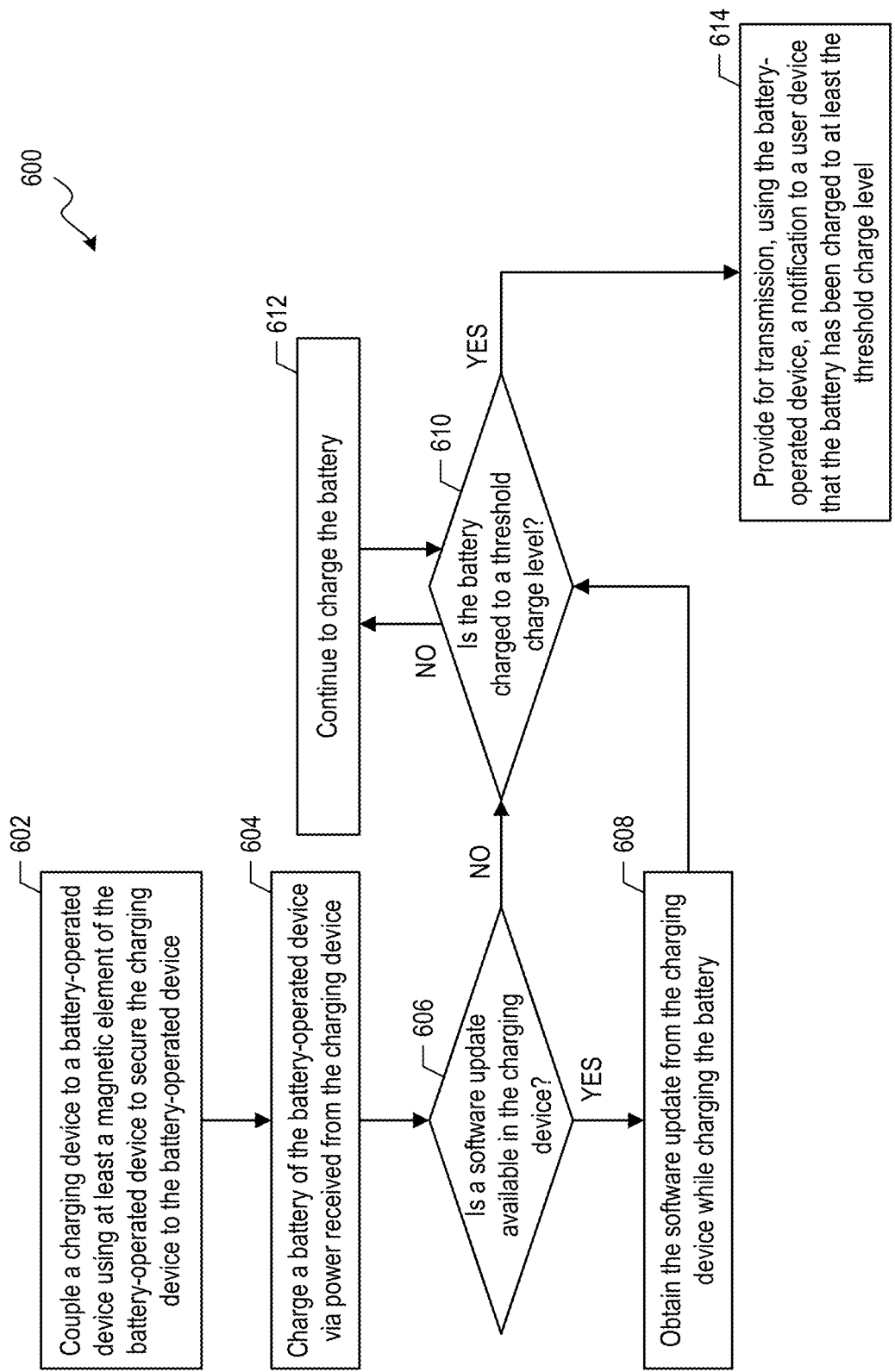
FIG. 6 illustrates a flow diagram of an example process for facilitating wireless charging of devices in accordance with one or more embodiments of the present disclosure.

FIG. 6 illustrates a flow diagram of an example process for facilitating wireless charging of devices in accordance with one or more embodiments of the present disclosure. For explanatory purposes, the example process 600 is described herein with reference to the example network environment 400 of FIG. 4; however, the example process 600 is not limited to the example network environment 400 of FIG. 4. Note that one or more operations may be combined, omitted, and/or performed in a different order as desired.

At block 602, the charging device 404 is coupled to the imaging device 402 to secure (e.g., hold in place) the charging device 404 to the imaging device 402. In an aspect, the magnetic element(s) 438 of the charging device 404 may couple to the magnetic element(s) 416 of the imaging device 402. For example, the magnetic element(s) 438 and 416 may couple when the user places the charging device 404 in proximity to or in contact with the imaging device 402. In some cases, the magnetic element(s) 416 may help align the magnetic element(s) 438 to allow more secure physical coupling, better coupling/alignment of the charging interface(s) 422 and 444 of the imaging device 402 and charging device 404, and/or aid the user in coupling the imaging device 402 to the charging device 404.

At block 604, the charging device 404 charges the battery 420 of the imaging device 402 when the charging device 404 is secured to the imaging device 402, e.g., via the magnetic element(s) 416 and 438. In this regard, the charging of the battery 420 of the imaging device 402 may be through power (e.g., current, voltage) coupled to the charging interface(s) 422 of the imaging device 402 from the charging interface(s) 444 of the charging device 404. By way of non-limiting example, the charging interface(s) 422 and 444 may be through conductive coupling (e.g., FIGS. 2A and 2B), inductive coupling (e.g., FIG. 2C), capacitive coupling (e.g., FIG. 2D), and/or other manners by which to allow charging of the imaging device 402 by the charging device 404. In some cases, when the imaging device 402 has multiple batteries, one battery or multiple batteries may be charged at a time.

At block 606, the imaging device 402 determines whether a software update is available in the charging device 404. For example, the charging device 404 may have an indication (e.g., a flag) stored in memory that is accessible and known to the imaging device 402 that indicates a current version of software. The memory location of the indication may be set during manufacturing of the imaging device 402 and/or charging device 404 and/or post-manufacturing by the user (e.g., as part of an initial setup of the imaging device 402 and charging device 404). The software may be an operating system software for the imaging device 402 and/or any other software associated with use of the imaging device 402.

When the imaging device 402 determines that a software update is available in the charging device 404, the imaging device 402 obtains the software update from the charging device while charging the battery 420 (and/or other batteries) at block 608. In some cases, the imaging device 402 may retrieve/download the software update from the charging device 404. In some cases, the charging device 404 may transmit the software update to the imaging device 402, e.g. via wireless communication (e.g., Wi-Fi, cellular, Bluetooth™, NFC, etc.). In some cases, the software update may be installed by the imaging device 402 while the battery 420 is being charged.

When the imaging device 402 determines that no software update is available in the charging device 404, or when the software update has been obtained, the imaging device 402 determines whether the battery 420 has been charged to a threshold charge level at block 610. The threshold charge level may be a default level or a charge level set by the user. When the imaging device 402 determines that the battery 420 has not been charged above the threshold level, the imaging device 402 allows the battery 420 to continue to be charged by the charging device 404 at block 612.

When the imaging device 402 determines that the battery 420 has been charged above the threshold charge level, the imaging device 402 provides for transmission a notification to the user device 406 that the battery 420 has been charged to the threshold level at block 614. The notification may be sent wirelessly over the network 408. As an example, the threshold level may be set to 100% charged, such that the notification is sent when the battery 420 is fully charged. In the case that the imaging device 402 has multiple batteries being charged by the charging device 404, the notification may be sent for each battery when each battery has been charged to the threshold level. In some cases, the threshold charge level may be less than 100%, and/or different threshold levels may be set for different batteries.

In some cases, the imaging device 402 may send a status associated with the battery 420 (and/or other batteries) at other points in time during the charging process. For example, the imaging device 402 may send the battery level of the battery 420 in substantially real time as the battery 420 is being charged. Alternatively or in addition, the imaging device 402 may send the battery level of the battery 420 at set points in time (e.g., every 5 minutes) and/or set battery levels (e.g., 50% charged, 75% charged, etc.).

The imaging device 402 may also transmit a notification when the software update is completely downloaded and/or completely installed. In some cases, the charging may be completed prior to the software update being completely installed. The notification of the battery level may allow the user to determine whether to remove the charging device 404 from the imaging device 402, since software update generally requires power. In some cases, alternative to or in addition to the software update, the imaging device 402 may determine whether to obtain and/or execute diagnostic tools from the charging device 404.

In some cases, when the charging device 404 is in proximity or secured to the imaging device 402, the imaging device 402 may provide credentials (e.g., exchange security key(s)) to the charging device 404 to authenticate itself to the charging device 404. In these cases, the charging device 404 may charge the imaging device 402 and/or provide a software update upon successful authentication. Alternative or in addition, the charging device 404 may provide credentials to authenticate itself to the imaging device 402.

In some cases, the imaging device 402 and the charging device 404 may provide information indicative of their capabilities to facilitate the charging process and/or other processes (e.g., software update transfer/retrieval processes). For instance, the imaging device 402 may indicate the number and type of charging interfaces included in the imaging device 402 to the charging device 404. Alternatively or in addition, the charging device 404 may indicate the number and type of charging interfaces included in the charging device 404 to the imaging device 402. The exchange of such information may facilitate the charging process, such as by allowing the imaging device 402 and/or charging device 404 to power down or place in low power mode components associated with unused charging interfaces.

In some cases, the imaging device 402 and/or charging device 404 may determine whether the devices 402 and 404 are compatible. If they are not compatible, the imaging device 402 and/or charging device 404 may provide a notification (e.g., on their respective displays 426 and 446, if available, and/or to the user device 406) of such lack of compatibility. In some cases, the notification may provide information indicating to the user a charging device (e.g., product name, brand, characteristics, price, reviews) that is compatible with the imaging device 402. Other information, such as communication capabilities (e.g., Wi-Fi, cellular, Bluetooth™, NFC) of the charging device 404, if any, can be determined or exchanged to facilitate processes, such as software update transfer/retrieval processes, diagnostic processes, etc.

Although the foregoing description is primarily with reference to battery-operated devices being wirelessly charged by a charging device, the battery-operated devices may also have terminals/connectors that allow transfer of power and/or data over wires. In this regard, alternative or in addition to wireless power transfer and wireless communication, the battery-operated devices may utilize wires for power transfer and/or data communication. Furthermore, although the foregoing describes an example application in which battery-operated devices are imaging devices (e.g., surveillance cameras), the battery-operated devices may be consumer electronics (e.g., smartphones, televisions, laptops, game consoles), kitchen appliances, radar-based sensor devices, sonar-based sensor devices, smoke detectors, gas detectors, pressure sensors, radiation monitors, and/or other generally any standalone or network-capable device that can be battery-operated.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, is program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

The invention claimed is:

1. An imaging device, comprising:
   a charging interface;
   a magnetic element configured to secure a charging device to the imaging device;
   a battery configured to power the imaging device and configured to be charged by the charging device via power received through the charging interface from the charging device when the charging device is secured to the imaging device; and
   a communication circuit configured to provide for transmission information associated with the battery to a user device,
   wherein the imaging device is configured to capture an image of a scene while the battery is being charged by the charging device.

2. The imaging device of claim 1, wherein the imaging device is a wireless camera.

3. The imaging device of claim 1, wherein the information comprises an indication of a charge level of the battery.

4. The imaging device of claim 1, further comprising:
   a processor circuit configured to determine whether a software update is available in the charging device when the charging device is secured to the imaging device by the magnetic element,
   wherein the communication circuit is configured to obtain the software update from the charging device when the software update is determined to be available.

5. The imaging device of claim 4, wherein the battery is configured to be charged by the charging device while the communication circuit is obtaining the software update from the charging device.

6. The imaging device of claim 1, wherein:
the communication circuit is further configured to transmit one or more packets to authenticate the imaging device to the charging device; and
the power is received through the charging interface from the charging device when the imaging device is successfully authenticated to the charging device.

7. The imaging device of claim 1, wherein the magnetic element is configured to align a charging interface of the charging device to the charging interface of the imaging device, and wherein the imaging device comprises an infrared camera.

8. The imaging device of claim 7, wherein the charging interface of the imaging device comprises a charging contact configured to receive the power from the charging device when the charging contact is in physical contact with the charging interface of the charging device.

9. The imaging device of claim 7, wherein the charging interface comprises a coil configured to inductively couple to the charging interface of the charging device when the charging device is secured to the imaging device.

10. The imaging device of claim 1, wherein a housing of the imaging device encloses at least a portion of the magnetic element and at least a portion of the charging interface, and wherein the imaging device comprises microbolometers configured to capture the image of the scene while the battery is being charged by the charging device.

11. A system comprising the imaging device of claim 1, wherein the system further comprises the charging device.

12. A method, comprising:
coupling a charging device to a battery-operated device using at least a magnetic element of the battery-operated device to secure the charging device to the battery-operated device, wherein the battery-operated device comprises an imaging device;
charging a battery of the battery-operated device via power received from the charging device when the charging device is secured to the battery-operated device;
providing for transmission, using the battery-operated device, information associated with the battery to a user device; and
capturing an image of a scene using the imaging device while the battery is being charged by the charging device.

13. The method of claim 12, further comprising authenticating the battery-operated device to the charging device, wherein the power is received from the charging device when the battery-operated device is successfully authenticated to the charging device.

14. The method of claim 12, further comprising:
determining whether a software update is available in the charging device when the charging device is secured to the battery-operated device; and
obtaining the software update from the charging device when the software update is determined to be available and while the battery is being charged.

15. The method of claim 12, wherein the magnetic element aligns a first charging interface of the battery-operated device with a second charging interface of the charging device, and wherein the battery is charged via the power received from the charging device through the first and second charging interfaces.

16. The method of claim 12, wherein the imaging device comprises a wireless camera.

17. A system, comprising:
a battery-operated device comprising an imaging device; and
a charging device comprising:
a charging interface;
a magnetic element configured to secure the charging device to the battery-operated device;
a battery configured to provide power to the battery-operated device via the charge interface when the charging device is secured to the battery-operated device;
a memory comprising data; and
a communication circuit configured to provide for transmission of the data to the battery-operated device while the power is being provided to the battery-operated device,
wherein the imaging device is configured to capture an image of a scene while the battery is being charged by the charging device.

18. The system of claim 17, wherein:
the communication circuit is further configured to transmit one or more packets to authenticate the charging device to the battery-operated device; and
the battery is configured to provide the power to the battery-operated device via the charge interface when the authentication is successful.

19. The system of claim 17, wherein the data comprises a software update.

20. The system of claim 17, wherein the imaging device comprises an infrared camera.

* * * * *

UNITED STATES PATENT AND TRADEMARK OFFICE
CERTIFICATE OF CORRECTION

Page 1 of 1

PATENT NO. : 10,873,203 B2
APPLICATION NO. : 15/906199
DATED : December 22, 2020
INVENTOR(S) : Teich et al.

It is certified that error appears in the above-identified patent and that said Letters Patent is hereby corrected as shown below:

In the Specification

In Column 7, Line 49, change "the is battery-operated" to --the battery-operated--.

In Column 19, Line 60, change "is and/or be magnetically" to --and/or be magnetically--.

In Column 26, Line 19, change "is program code" to --program code--.

Signed and Sealed this
Second Day of March, 2021

Drew Hirshfeld
*Performing the Functions and Duties of the
Under Secretary of Commerce for Intellectual Property and
Director of the United States Patent and Trademark Office*